(12) United States Patent
Cutler et al.

(10) Patent No.: US 8,750,170 B2
(45) Date of Patent: *Jun. 10, 2014

(54) METHOD AND SYSTEM FOR AUTHORIZING SESSIONS USING SUBSCRIBER DATABASE

(71) Applicants: Kevin Scott Cutler, Carp (CA); Susan Patricia Ackerman, Kanata (CA); Steve Rock, Carp (CA); Felix Katz, Nepean (CA); Kalyan Premchand Siddam, Nepean (CA); Fernando Cuervo, Dunrobin (CA)

(72) Inventors: Kevin Scott Cutler, Carp (CA); Susan Patricia Ackerman, Kanata (CA); Steve Rock, Carp (CA); Felix Katz, Nepean (CA); Kalyan Premchand Siddam, Nepean (CA); Fernando Cuervo, Dunrobin (CA)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,013

(22) Filed: Feb. 8, 2013

(65) Prior Publication Data

US 2013/0215793 A1    Aug. 22, 2013

Related U.S. Application Data

(63) Continuation of application No. 12/824,969, filed on Jun. 28, 2010, now Pat. No. 8,400,916.

(51) Int. Cl.
*H04L 12/24* (2006.01)

(52) U.S. Cl.
USPC ........... 370/259; 370/229; 370/240; 370/329; 455/403; 455/406; 455/408

(58) Field of Classification Search
USPC .......... 370/229, 240, 259, 329–337; 455/403, 455/405, 406, 408
See application file for complete search history.

(56) References Cited

U.S. PATENT DOCUMENTS

| 8,400,916 | B2 * | 3/2013 | Cutler et al. | 370/230 |
| 2008/0046963 | A1 * | 2/2008 | Grayson et al. | 726/1 |
| 2011/0320584 | A1 * | 12/2011 | Siddam et al. | 709/224 |
| 2012/0134264 | A1 * | 5/2012 | Ludwig et al. | 370/230 |

OTHER PUBLICATIONS

ETSI TS 129 212. "Universal Mobile Telecommunications System (UMTS); LTE; Policy and Charging Control Over GX Reference Point (3GPP TS 29.212 version 9.2.0 Release 9)", 2010.
ETSI TS 129 213. "Digital Cellular Telecommunications System (Phase 2+); Universal Mobile Telecommunications System (UMTS); L TE; Policy and Charging Control Signaling Flows and Quality of Service (QoS) Parameter Mapping (3GPP TS 29.213 version 9.2.0 Release 9)",2010.
ETSI TS 129 214. "Universal Mobile Telecommunications System (UMTS); LTE; Policy and Charging Control Over RX Reference Point (3GPP TS 29.214 version 9.3.0 Release 9)", 2010.

\* cited by examiner

*Primary Examiner* — Charles C Jiang
*Assistant Examiner* — Mohamed Kamara
(74) *Attorney, Agent, or Firm* — Kramer Amado P.C.

(57) ABSTRACT

Various exemplary embodiments relate to a method and related network node including one or more of the following: receiving, at a policy and charging rules node (PCRN) from a requesting entity, a message including a request associated with at least one service data flow (SDF); extracting a subscriber identifier and a first identifier from the message; retrieving a subscription record associated with the subscriber identifier, wherein the subscription record is associated with a first plurality of subrecords; identifying an first subrecord from the plurality of subrecords based on the first identifier; and conditionally fulfilling the request based on a first value stored in the first subrecord.

20 Claims, 4 Drawing Sheets

FIG. 3

| USER ID | SUBSCRIPTION IDs | APN | MAX B/W BY QCI | MAX GBR BY QCI | AMBR | APPLICATION ID | MAX APPLICATION BANDWIDTH |
|---|---|---|---|---|---|---|---|
| 0xA532 | A,B,C | 0xBB4D | 9-256/512<br>8-256/256<br>7-128/256<br>6-64/128 | 9-64/128<br>8-64/64<br>7-64/64<br>6-32/32 | 1024/1024 | 0x45FF | 32/64 |
|  |  |  |  |  |  | 0x2D95 | 32/128 |
|  |  |  |  |  |  | ... | ... |
|  |  | 0x5306 | 9-512/1024<br>8-512/256 | 9-32/64<br>8-16/16 | 256/256 | 0x45FF | 8/16 |
|  |  | ... | ... | ... | ... | ... | ... |
| ... | ... |  |  |  |  |  |  |

FIG. 4

| RULE NAME | USER ID | APN | APPLICATION ID | QCI | MAX BANDWIDTH | GUARANTEED BANDWIDTH |
|---|---|---|---|---|---|---|
| 0x440E | 0xA532 | 0xBB4D | 0x2D95 | 3 | 16/32 | – |
| 0xF2FF | 0xA532 | 0xBB4D | 0x7021 | 7 | 128/128 | 64/64 |
| 0x1184 | 0xA532 | 0xBB4D | 0x34FE | 8 | 32/256 | 32/32 |
| 0x85C2 | 0xA532 | 0x5306 | 0xE36C | 8 | 16/16 | 16/16 |
| 0x7C21 | 0x4215 | 0xBB4D | 0x2D95 | 8 | 32/256 | 32/32 |
| ... | ... | ... | ... | ... | ... | ... |

METHOD AND SYSTEM FOR AUTHORIZING SESSIONS USING SUBSCRIBER DATABASE

RELATED APPLICATIONS

This application is a continuation of application Ser. No. 12/824,969, filed on Jun. 28, 2010, the entire disclosure of which is hereby incorporated herein by reference for all purposes as if fully set forth herein.

TECHNICAL FIELD

Various exemplary embodiments disclosed herein relate generally to policy and charging in telecommunications networks.

BACKGROUND

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the internet protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "long term evolution" (LTE). In an LTE network, all communications are carried over an IP channel from user equipment (UE) to an all-IP core called the evolved packet core (EPC). The EPC then provides gateway access to other networks while ensuring an acceptable QoE and charging a subscriber for their particular network activity.

The 3GPP generally describes the components of the EPC and their interactions with each other in a number of technical specifications (TS). Specifically, 3GPP TS 29.212, 3GPP TS 29.213, and 3GPP TS 29.214 describe the policy and charging rules function (PCRF), policy and charging enforcement function (PCEF), and bearer binding and event reporting function (BBERF) of the EPC. These specifications further provide some guidance as to how these elements interact in order to provide reliable data services and charge subscribers for use thereof.

For example, 3GPP TS 29.212 and 3GPP TS 29.214 provide some guidance on the establishment of an application session by the EPC upon receipt of an application request from an application function (AF) in the form of an authorization and authentication request (AAR) message or from a packet data network gateway (PGW) in the form of a Credit Control Request (CCR) message. The standards specify that the PCRF is responsible for receiving new application requests, creating new policy and charging control (PCC) rules commensurate with such requests, and providing these new PCC rules to the PCEF for installation. The 3GPP standards also define the format of application request messages and PCC rules.

The 3GPP standards do not, however, describe how the PCRF should interpret an application request or create PCC rules. The 3GPP standards further do not describe how to determine whether an application request should be fulfilled or denied. Without a means to create appropriate PCC rules based on an application request, the EPC may not be able to establish application sessions, charge subscribers for application usage, or ensure that a certain QoE level is met in providing services to all users.

In view of the foregoing, it would be desirable to provide a method for dynamically authorizing creating new PCC rules in fulfillment of application requests. In particular, it would be desirable to provide a PCRF that may flexibly respond to AF and PGW application requests by authorizing and creating new PCC rules that achieve the objects of the received requests.

SUMMARY

In light of the present need for a method for dynamically authorizing and creating new PCC rules in fulfillment of application requests, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node including one or more of the following: receiving, at the policy and charging rules node (PCRN) from a requesting entity, a message including a request associated with at least one service data flow (SDF), wherein the request includes at least one requested bandwidth for an SDF of the at least one SDF; extracting at least one subscriber identifier from the message; retrieving a subscription record associated with the at least one subscriber identifier; determining whether the request should be fulfilled by performing at least one comparison of the at least one requested bandwidth for the SDF against at least one field of the subscription record; if the request should be fulfilled, establishing the SDF; and if the request should not be fulfilled: generating a response message that indicates that the request was rejected, and transmitting the response message to the requesting entity.

According to the foregoing, various exemplary embodiments provide for a system that utilizes a robust method for authorizing and fulfilling application requests. Particularly, by ensuring that fulfillment of a request would not violate limits contained in a subscription profile record and/or operator policy, a PCRN may ensure that only valid requests are fulfilled while implementing per subscriber, per APN, per QCI, and/or per application usage limits.

BRIEF DESCRIPTION OF THE DRAWINGS

In order to better understand various exemplary embodiments, reference is made to the accompanying drawings, wherein:

FIG. 3 illustrates an exemplary data arrangement for storing subscriber information;

FIG. 4 illustrates an exemplary data arrangement for storing PCC rules; and

DETAILED DESCRIPTION

Figure 1:
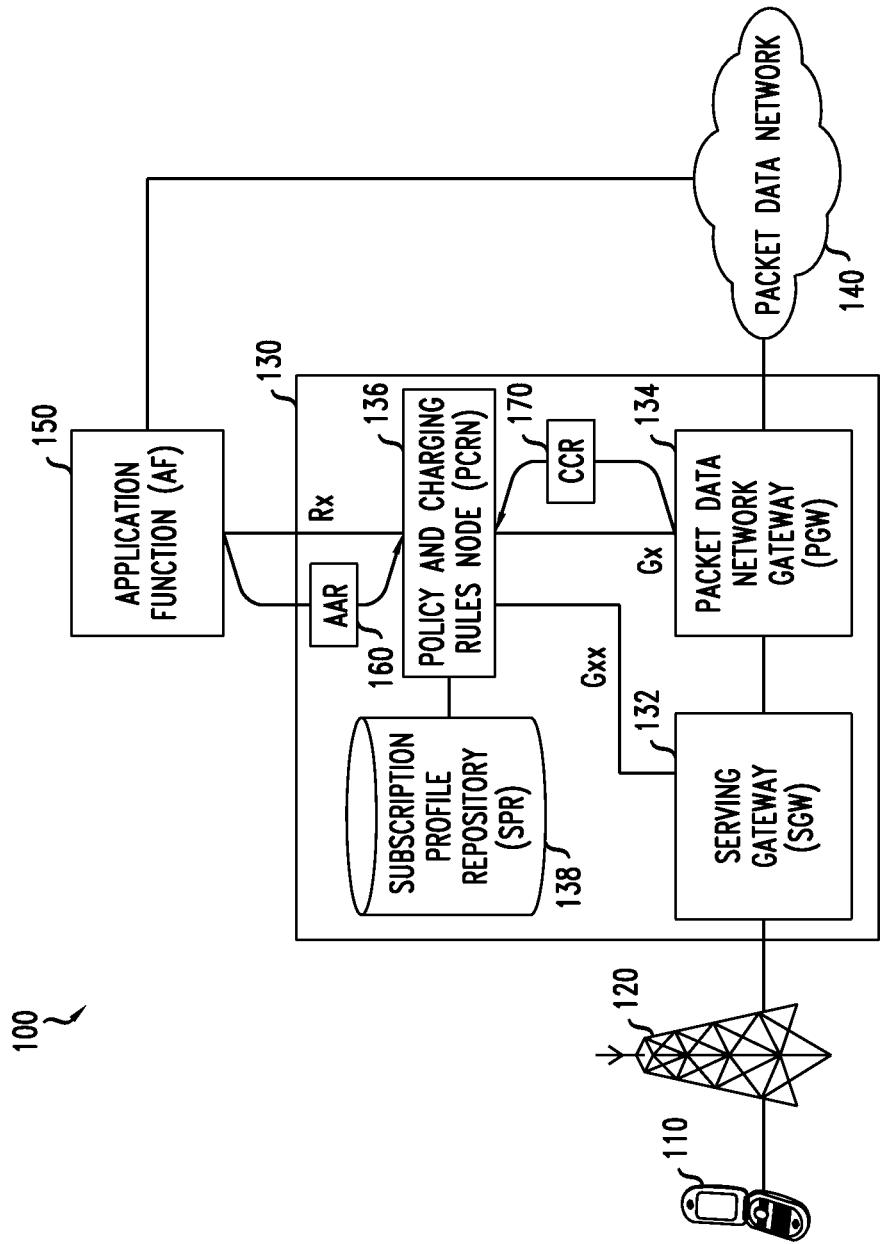
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a communications network, such as an LTE or 4G mobile communications network, for providing access to various services. The network 100 may include user equipment 110, base station 120, evolved packet core (EPC) 130, packet data network 140, and application function (AF) 150.

User equipment 110 may be a device that communicates with packet data network 140 for providing an end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or association of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138. Alternatively, EPC 130 may be any other packet core known to those of skill in the art.

Serving gateway (SGW) 132 may be a device that provides gateway access to the EPC 130 to an end user of network 100. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. SGW 132 may further be in communication with PCRN 136 via a Gxx interface and may be capable of transmitting credit control requests (CCR) to PCRN 136. In various implementations, such as those implementing the proxy mobile IP (PMIP) standard, SGW 132 may include a bearer binding and event reporting function (BBERF). In various exemplary embodiments, EPC 130 may include multiple serving gateways (SGWs) (not shown) and each SGW may communicate with multiple base stations (not shown). In such embodiments, additional SGWs (not shown) may be designated as non-primary SGWs (NP-SGWs) (not shown) for user equipment 110.

Packet data network gateway (PGW) 134 may be a device that provides gateway access to packet data network 140 to an end user of network 100. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services. Upon receiving a request for an unknown application service from UE 110, PGW 134 may construct a credit control request (CCR) that requests an appropriate allocation of resources and forward the CCR to PCRN 136.

It should be noted that while exemplary network 100 corresponds to one particular implementation of long term evolution (LTE), many variations may exist. For example, SGW 132 may not be present, PGW 134 may not be present, and/or the functions of SGW 132 and PGW 134 may be consolidated into a single device or spread across multiple additional devices. Alternatively, non-LTE networks such as, for example, GPRS or 3G, could be used.

Policy and charging rules node (PCRN) 136 may be a device that receives requests related to service data flows (SDFs) and IP-CAN sessions, generates PCC rules, and provides PCC rules to the PGW 134 and/or other PCENs (not shown). PCRN 136 may be in communication with AF 150 via an Rx interface. PCRN 136 may receive an application request in the form of an authorization and authentication request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive a request in the form of a credit control request (CCR) 170 from SGW 132 or PGW 134. As with AAR 160, upon receipt of CCR 170, PCRN may take appropriate action in response, such as, for example, generating at least one new PCC rule for fulfilling and/or responding to the CCR 170. In various embodiments, AAR 160 and CCR 170 may represent two independent requests to be processed separately, while in other embodiments, AAR 160 and CCR 170 may carry information regarding a single request, and PCRN 136 may take action based on the combination of AAR 160 and CCR 170. In various embodiments, PCRN 136 may be capable of handling both single-message and paired-message requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate quality of service (QoS) rules. Upon creating a new QoS rule or upon request by the SGW 132, PCRN 136 may provide a QoS rule to SGW 132 via the Gxx interface.

As will be described in further detail below with respect to FIGS. 2-5, PCRN 136 may authorize application requests based on subscriber information. For example, each subscriber may be associated with particular allowable bandwidths in the subscription profile registry; upon receiving a request from a particular user, the PCRN 136 may determine whether fulfillment of the request would exceed any allowed bandwidth for the subscriber. If fulfillment would violate one of these upper limits, the PCRN 136 may simply reject the request. In various embodiments, the PCRN 136 may also inform the requesting device as to why the request was rejected and what requested bandwidth would have been acceptable.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. As will be described in further detail with reference to FIG. 3, data stored by SPR 138 may include identifiers for each subscriber and indications of subscription information for each subscriber such as, for example, bandwidth limits, charging parameters, and subscriber priority. Bandwidth limits may further be defined per application, per access point name (APN), and/or per QoS class identifier (QCI).

Packet data network 140 may be a network (e.g., the Internet or another network of communications devices) for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authorization and authentication request (AAR) 160 defined by the Diameter protocol, to notify the PCRN 136 that resources should be allocated for the application service. This application request message may include information such as an identification of a subscriber using the application service and an identification of the particular service data flows desired to be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-5.

PCRN 136 may receive a request, from AF 150 and/or PGW 134, for the establishment of an SDF associated with a particular application and requesting a particular maximum bit rate (MBR) and/or guaranteed bit rate (GBR). Before PCRN 136 proceeds to generate a PCC rule to establish the new SDF, PCRN 136 may retrieve a relevant subscription record from SPR 138. PCRN 136 may proceed to determine whether establishment of the SDF as requested would exceed any of the limits or restrictions for this subscriber. For example, PCRN 136 may determine whether the requested maximum bandwidth will cause the total bandwidth provisioned for the application to exceed a maximum application bandwidth value associated with the subscriber and application. As a further example, PCRN 136 may determine whether the requested maximum bandwidth will exceed an aggregate maximum bit rate (AMBR) associated with the subscriber and APN. If fulfillment of the request would lead to violation of any of these limits for the subscriber, the PCRN 136 may reject the request. Otherwise, the PCRN 136 may proceed to generate appropriate PCC rules for fulfilling the request.

Figure 2:
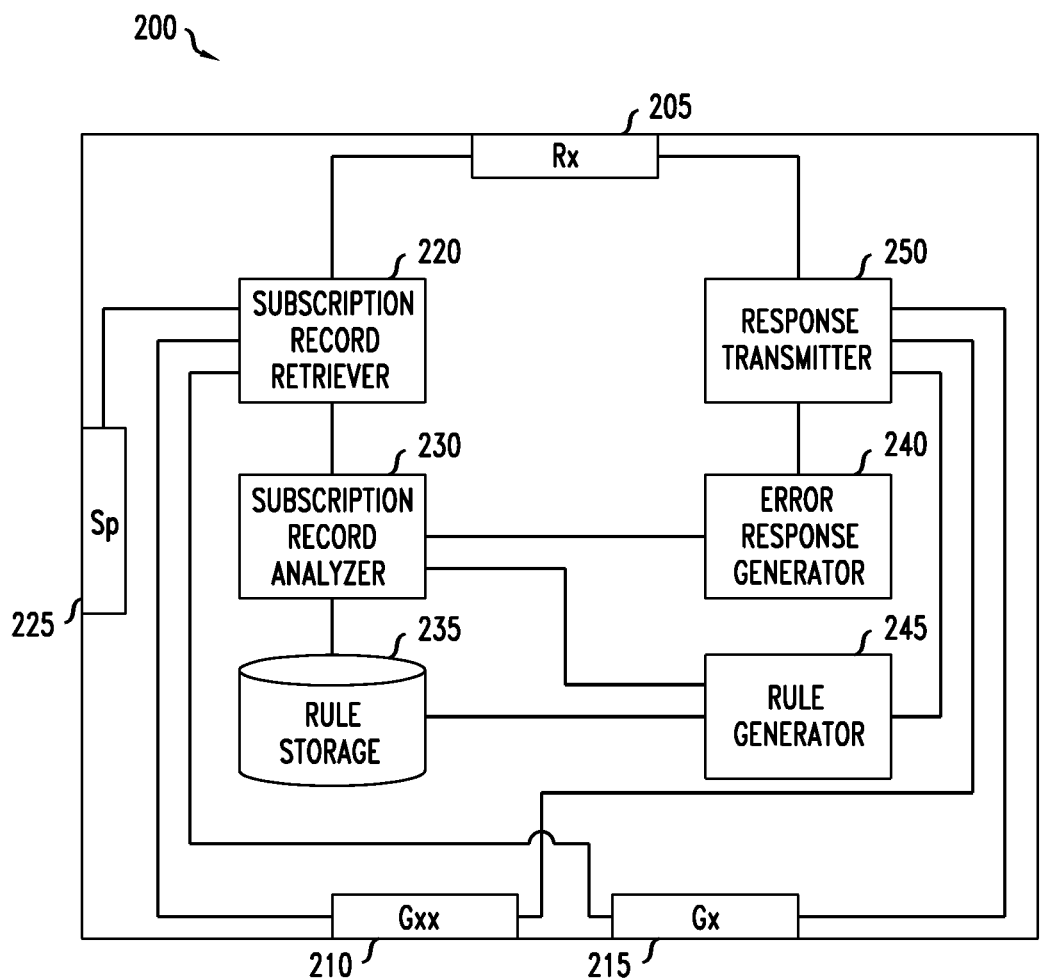
FIG. 2 illustrates an exemplary policy and charging rules node (PCRN) for authorizing sessions using subscriber information.

FIG. 2 illustrates an exemplary policy and charging rules node (PCRN) 200 for authorizing sessions using subscriber information. PCRN 300 may correspond to PCRN 136 and may include Rx interface 205, Gxx interface 210, Gx interface 215, subscription record retriever 220, Sp interface 225, subscription record analyzer 230, rule storage 235, error response generator 240, rule generator 245, and response transmitter 250.

Rx interface 205 may be an interface comprising hardware and/or executable instructions encoded on a machine-readable storage medium configured to communicate with an AF such as AF 150. Such communication may be implemented according to the 3GPP TS 29.214. For example, Rx interface 215 may receive application requests, session requests, and event notifications in the form of an AAR and transmit answers, rejections, and other status notifications in the form of an AAA or RAR.

Gxx interface 210 may be an interface comprising hardware and/or executable instructions encoded on a machine-readable storage medium configured to communicate with an SGW such as SGW 132. Such communication may be implemented according to the 3GPP TS 29.212. Thus, Gxx interface 210 may transmit QoS rules for installation and rejections of application requests. Gxx interface 210 may further receive UE-originated application requests, session requests, and event notifications in the form of a CCR.

Gx interface 215 may be an interface comprising hardware and/or executable instructions encoded on a machine-readable storage medium configured to communicate with a PGW such as PGW 134. Such communication may be implemented according to the 3GPP TS 29.212. Thus, Gx interface 215 may receive transmit PCC rules for installation and rejections of application requests. Gx interface 215 may further receive UE-originated application requests, session requests, and event notifications in the form of a CCR.

Subscription record retriever 220 may include hardware and/or executable instructions on a machine-readable storage medium configured to retrieve an appropriate subscription profile record via Sp interface 225. Subscription record retriever 220 may first receive an application request via Rx interface 205, Gxx interface 210, and/or Gx interface 215 and then extract one or more subscription identifiers from the received request. Subscription record retriever 225 may then retrieve a subscription record associated with the one or more subscription identifiers via Sp interface 225. This may be accomplished, for example, by submitting a query for a record matching the subscription identifiers. As will be described in further detail below with respect to FIG. 3, each subscription record may include multiple bandwidth and other limits for the subscriber. For example, each record may indicate a maximum allowable bandwidth for an application, an AMBR for an APN, a maximum allowable bandwidth for a QCI, and/or a maximum allowable GBR for a QCI.

Sp interface 225 may be an interface comprising hardware and/or executable instructions encoded on a machine-readable storage medium configured to communicate with a SPR such as SPR 138. Thus, Sp interface 225 may transmit record requests and receive subscription profile records. In various embodiments, where SPR 138 is a component of PCRN 200, Sp interface 225 may be the SPR 138 itself or act as a frontend to the local SPR.

Subscription record analyzer 230 may include hardware and/or executable instructions on a machine-readable storage medium configured to determine whether fulfillment of a request would cause a violation of any limits for the subscriber as indicated by the subscription record. In making this determination, subscription record analyzer may refer to rule storage 235 so it may consider the bandwidth already provisioned for the particular subscriber. If fulfillment would cause a violation, subscription record analyzer 230 may pass the request and information related to the potential violation to the error response generator 240. If no violation would occur, subscription record analyzer may pass the request to rule generator 245 for fulfillment of the request. In various alternative embodiments, PCRN 200 may only reject those parts of a request that would violate a set subscriber limit. For example, if one SDF of three would be allowable, PCRN 200 may pass that one SDF to rule generator 245 while sending the other two SDFs to error response generator 240.

In various alternative embodiments, subscription record analyzer 230 may be capable of authorizing alternative QoS information when the requested QoS can not be authorized. For example, based on various information carried by the request message, such as in a QoS-Negotiation or QoS-Upgrade AVPs; information stored at PCRN 200; and/or information stored at SPR 138, subscription record analyzer 230 may determine that certain modifications to the requested QoS are acceptable. Thereafter, if fulfilling a request would cause a violation of any bandwidth limits imposed on the subscriber, subscription record analyzer 230 may attempt to authorize a reduced or increased amount of bandwidth for the request in an effort to avoid violating any subscriber limits.

Rule storage 235 may be any machine-readable medium capable of storing PCC rules generated by the PCRN 200. Accordingly, rule storage 235 may include a machine-readable storage medium such as read-only memory (ROM), random-access memory (RAM), magnetic disk storage media, optical storage media, flash-memory devices, and/or similar storage media. As will be described in further detail below with respect to FIG. 4, rule storage 235 may store definitions of numerous PCC rules created by PCRN 200. Such definitions may include, for example, rule names, service data flow filters, QoS parameters, and charging parameters.

Error response generator 240 may include hardware and/or executable instructions on a machine-readable storage medium configured to generate a message indicating that a request has been rejected. Error response generator 240 may receive a request message from subscription record analyzer 230 and determine the appropriate recipient and format for the corresponding error response message. For example, if the request was an AAR from AF 150, error response generator 240 may determine that it should generate an authorization and authentication answer (AAA) for transmission to AF 150. Error response generator 240 may include a simple indication that the request has been rejected in the error response by, for example, including REQUESTED_SERVICE_NOT_AUTHORIZED error within the message. In various alternative embodiments, error response generator may further include information helpful to the requesting entity in generating a new request that will be fulfilled. For example, error response generator 240 may include an Acceptable-Service-Information (ASI) attribute-value pair (AVP) within the error response. The ASI AVP may indicate what bandwidths would have been allowable, thereby resulting in the fulfillment of the request.

Rule generator 245 may include hardware and/or executable instructions on a machine-readable storage medium configured to receive a request for the establishment of at least one SDF from subscription record analyzer 230 and to generate one or more PCC and/or QoS rules for establishing the requested SDFs. Rule generator 245 may use information contained in the request, information from an SPR such as SPR 138, the results of a policy decision (not shown), and or any other information or methods recognized by those of skill in the art as useful in generating appropriate rules for each SDF. After generating appropriate rules, rule generator 245 may store the rules in rule storage 235 and generate at least one message for installing the rules in the appropriate nodes. For example, the rule generator 245 may generate a CCA or RAR for installing the PCC rules in SGW 134. In various embodiments, rule generator 245 may also generate a CCA or RAR for installing corresponding QoS rules in at least one PGW, such as PGW 132. After generating such messages, rule generator 245 may forward the messages to response transmitter 250.

Response transmitter 250 may include hardware and/or executable instructions on a machine-readable storage medium configured to receive messages from error response generator 240 and rule generator 245 and transmit them to the appropriate network devices. For example, if response transmitter 250 receives an AAA destined for AF 150 from error response generator 240, response transmitter 250 may transmit the AAA to AF 150 via Rx interface 205. As another example, if response transmitter 250 receives a RAR destined for PGW 134 from rule generator 245, response transmitter 250 may transmit the RAR to PGW 134 via Gx interface 215.

FIG. 3 illustrates an exemplary data arrangement 300 for storing subscriber information. Data arrangement 300 may be, for example, a table in a database stored in SPR 138 or at any other element internal or external to PCRN 300 and accessible by subscription record retriever 220. Alternatively, data arrangement 300 could be a series of linked lists, an array, or a similar data structure. Thus, it should be apparent that data arrangement 300 is an abstraction of the underlying data; any data structure suitable for storage of the underlying data may be used.

Data arrangement 300 may contain numerous fields: user ID field 305, subscription IDs field 310, APN field 315, maximum bandwidth by QCI field 320, maximum GBR by QCI field 325, AMBR field 330, application id field 335, and maximum application bandwidth field 340. It will be appreciated by one of ordinary skill in the art that data arrangement 300 may contain numerous additional fields for storing additional information such as, for example, charging parameters, priority information, personal information, and custom data.

User ID field 305 may be used to store a unique identifier for the particular user with which a record is associated. Subscription ID field 310 may store a set of identifiers that other entities, such as AF 150 or PGW 132, may use to refer to the user. APN field 315 may be used to store an identifier of a particular access point (e.g., the APN) with which the user may be associated. In various embodiments, a user may be associated with multiple access points. Accordingly, in such embodiments, there may be a one-to-many relationship between the user ID field 305 and APN field 315, as shown in FIG. 3.

Maximum bandwidth by QCI field 320 may indicate a maximum bandwidth available in association with each QCI for a particular user on a particular APN. Accordingly, there may be a one-to-many relationship between the user ID field 305 and maximum bandwidth by QCI field 320, as shown in FIG. 3. In various alternative embodiments, the maximum bandwidth associated with each QCI may be set regardless of the APN that is in use. In such embodiments, there may be a one-to-one relationship between the maximum bandwidth by QCI field 320 and user ID field 305. Maximum bandwidth by QCI field 320 may include one value for each possible QCI. For example, in embodiments using nine QCIs, maximum bandwidth by QCI field 320 may include nine different values for maximum bandwidths.

Maximum GBR by QCI field 325 may indicate a maximum GBR available in association with each QCI for a particular user on a particular APN. Accordingly, there may be a one-to-many relationship between the user ID field 305 and maximum GBR by QCI field 325, as shown in FIG. 3. In various alternative embodiments, the maximum GBR associated with each QCI may be set regardless of the APN that is in use. In such embodiments, there may be a one-to-one relationship between the maximum GBR by QCI field 325 and user ID field 305. Maximum GBR by QCI field 325 may include one value for each possible QCI. For example, in embodiments using nine QCIs, maximum GBR by QCI field 325 may include nine different values for maximum GBRs. In various embodiments, certain QCIs may not be associated with any GBR value. For example, QCIs 1, 2, 3, and 4 may be associated with maximum GBR values while QCIs 5, 6, 7, 8, and 9 may not be associated with any GBR value.

AMBR field 330 may indicate an aggregate maximum bit rate available to a particular user on a particular APN. Accordingly, there may be a one-to-many relationship between the user ID field 305 and AMBR field 330, as shown in FIG. 3. In various alternative embodiments, the AMBR may be set regardless of the APN that is in use. In such embodiments, there may be a one-to-one relationship between the maximum AMBR field 330 and user ID field 305. In various embodiments, not all records may include a value for AMBR field 330. This may indicate that no AMBR should be enforced for the particular user on the particular APN. Further, in various embodiments, such as those including GPRS access types, AMBR may not be applicable and AMBR field 330 may contain no value for certain records or may not be included in data arrangement 300.

Application ID field 335 may be used to store an identifier for a particular application offered over a data network. For example, a value in application ID field 335 may identify a particular video-conferencing application or gaming application. Each subscriber may be able to access a number of applications via each APN. Accordingly, there may be a one-to-many relationship between the user ID field 305 and application ID field 335, as well as a one-to-many relationship between APN 315 field and application ID field 335, as is shown in FIG. 3. It will be apparent to a person of skill in the art that various alternative arrangements could be used, including for example, an arrangement where there is a one-to-one relationship between the application ID field 335 and APN field 315 and/or user ID field 305. Maximum application bandwidth field 340 may indicate a maximum bandwidth available to a user for a particular application.

As an example, subscription record 350 may correspond to a user having the user identifier "0xA532" and subscription identifiers "A," "B," and "C." This user may be associated with a number of APNs, as indicated by APN sub-records 360, 370, 380. APN sub-record 360 may be associated with the APN "0xBB4D." For this subscriber, the APN may be associated with a number of maximum bandwidths available for each QCI. As shown in APN sub-record 360, the QCI "9" may be associated with 256 kbps uplink and 512 kbps downlink, while the QCI "8" is associated with 256 kbps in both directions. APN sub-record 360 may include a maximum bandwidth value for each available QCI. In various alternative embodiments, APN sub-record 360 may not provide a maximum bandwidth for at least one QCI. In some embodiments, this may indicate that the QCI is unavailable to the user on this APN, while in other embodiments, this may indicate that no maximum bandwidth will be enforced for that QCI.

APN sub-record 360 may further indicate that for QCI "9" for this user of the APN, the maximum GBR is 64 kbps upstream and 128 kbps downstream. APN sub-record 360 may include a maximum GBR value for each available QCI. In various alternative embodiments, APN sub-record 360 may not provide a maximum bandwidth for at least one QCI. In some embodiments, this may indicate that the QCI is unavailable to the user on this APN. In other embodiments, this may indicate that GBR is unavailable to this user for the QCI on this APN, while in a third group of embodiments, this may indicate that no maximum GBR will be enforced for that QCI. APN sub-record 360 may further indicate that an AMBR of 1024 kbps in both directions will be enforced for this user on this APN.

APN sub-record 360 may include a number of application sub-records 363, 365, 367. Application sub-record 363 may indicate, for example, that the application identified as "0x45FF" has a maximum allowable bandwidth of 32 kbps upstream and 64 kbps downstream for this user on this APN. Likewise, application sub-record 365 may indicate that the application identified as "0x2D95" has a maximum allowable bandwidth of 32 kbps upstream and 128 kbps downstream. APN sub-record 360 may include numerous additional application sub-records 367.

Subscription record 350 may also include APN sub-record 370, which may be associated with APN "0x5306." APN sub-record 370 may indicate maximum bandwidth and GBR values for each QCI. For example, QCI "9" may have a maximum bandwidth of 512 kbps upstream and 1024 kbps downstream for this user of this APN. APN sub-record 370 may also indicate a maximum GBR of 32 kbps upstream and 64 kbps downstream for QCI "9" for this user on this APN. APN sub-record 370 may further indicate that an AMBR of 256 kbps in both directions in applicable to APN "0x5306."

APN sub-record 370 may also include numerous application sub-records 373, 375. For example, application sub-record 373 may indicate that application "0-x45FF" has a maximum bandwidth of 8 kbps upstream and 16 kbps downstream for this user on this APN. APN sub-record 370 may contain numerous additional application sub-records 375. Subscription record 350 may contain numerous additional APN sub-records 380, and data arrangement 300 may contain numerous additional subscription records 390.

FIG. 4 illustrates an exemplary data arrangement 400 for storing PCC rules. Data arrangement 400 may be, for example, a table in a database stored in rule storage 235 or at any other element internal or external to PCRN 300. Alternatively, data arrangement 400 could be a series of linked lists, an array, or a similar data structure. Thus, it should be apparent that data arrangement 400 is an abstraction of the underlying data; any data structure suitable for storage of the underlying data may be used.

Data arrangement 400 may contain numerous fields such as, for example, rule name field 405, user ID field 410, APN field 415, application ID 420, QCI field 425, maximum bandwidth field 430, and guaranteed bandwidth field 435. Data arrangement 400 may contain additional fields (not shown) necessary or helpful in defining PCC rules such as, for example, and IP-CAN session identifier, charging parameters, and/or service data flow filters. It will be apparent to one of skill in the art that various modifications may be made to data arrangement 400 and the operation of PCRN 200. For example, some fields shown in FIG. 4 may not be included in a PCC rule and instead the information therein may be deduced from the information in fact available.

Rule name field 405 may be a field used to uniquely identify a PCC rule and/or a corresponding QoS rule. User ID field 410 may be used to identify at least one user associated with the PCC rule. A value held in user ID field 410 may correspond, for example, to a value in user ID field 305 or subscription IDs field 310 of data arrangement 300. Accordingly, user ID field 410 may be used to retrieve a subscription record associated with the rule. In various alternative embodiments, data arrangement 400 may not include user ID field 410. Instead, each rule record may include an identifier of an associated IP-CAN session. In such embodiments, to determine a user associated with a rule record, PCRN 200 may look up a user associated with the identified IP-CAN session. Thus, It should be apparent to the person of skill in the art that data arrangement 400 may be a simplification of an implemented data arrangement.

APN field 415 may indicate an access point associated with the PCC rule. For example, APN field 415 may correspond to APN field 315 of data arrangement 300. In various alternative embodiments, APN field 415 may not be included in data arrangement 400 and, instead, PCRN 200 may determine an APN associated with the PCC rule from information such as, for example, an IP-CAN session associated with the rule and an APN associated with the IP-CAN session. It will be apparent to a person of skill in the art that there are numerous alternative methods of determining an APN associated with a particular PCC rule.

Application ID field 420 may indicate an application associated with the PCC rule. For example, application ID field 420 may correspond to application ID field 335 of data arrangement 300. In various alternative embodiments, application ID field 420 may not be included and, instead, PCRN 200 may deduce an application ID associated with a particular PCC rule from information such as, for example, an application function associated with the PCC rule and an application associated with the application function. It will be apparent to a person of skill in the art that there are numerous alternative methods of determining an APN associated with a particular PCC rule.

QCI field 425 may indicate a QCI associated with the particular rule. Maximum bandwidth field 430 may indicate a maximum bandwidth appropriated to the particular rule. Guaranteed bandwidth field 435 may indicate a guaranteed bandwidth associated with the particular rule.

As an example, rule record 440 indicates that the rule "0x440E" is associated with user ID "0xA532," APN "0xBB4D," and application ID "0x2D95." Rule record 440 is associated with a QCI of 3, is allowed a maximum bandwidth of 16 kbps upstream and 32 kbps downstream. Rule record 440 may not be associated with a guaranteed bandwidth and thus may not be a GBR flow.

As further examples, rule records 445, 450 may indicate that rules "0xF2FF" and "0x1184", respectively, are also associated with user ID "0xA532" and APN "0xBB4D." Rule record 445 may indicate that the rule "0xF2FF" is associated with application ID "0x7021," QCI "7," a maximum bandwidth of 128 kbps in both directions, and a guaranteed bandwidth of 64 kbps in both directions. Rule record 450 may indicate that rule "0x1184" is associated with application ID "0x34FE," QCI "8," a maximum bandwidth of 32 kbps upstream and 256 kbps downstream, and a guaranteed bandwidth of 32 kbps in both directions.

Rule record 455 may indicate that rule "0x85C2" is also associated with user ID "0xA532," but, unlike rule records 440, 445, 450, is associated with APN "0x5306" and application ID "0xE36C." Rule record 455 may indicate that rule "0x85C2" is associated with QCI "8," a maximum bandwidth of 16 kbps in both directions, as well as a guaranteed bandwidth of 16 kbps in both directions.

Finally, rule record 460 may indicate that rule "0x7C21" is associated with user ID "0x4215," APN "0xBB4D," application ID "0x2D95," and QCI "8." Rule record 460 may further indicate that rule "0x7C21" has a maximum bandwidth of 32 kbps upstream and 256 kbps downstream, as well as a guaranteed bandwidth of 32 kbps in both directions. Data arrangement 400 may contain numerous additional rule records 465.

Figure 5:
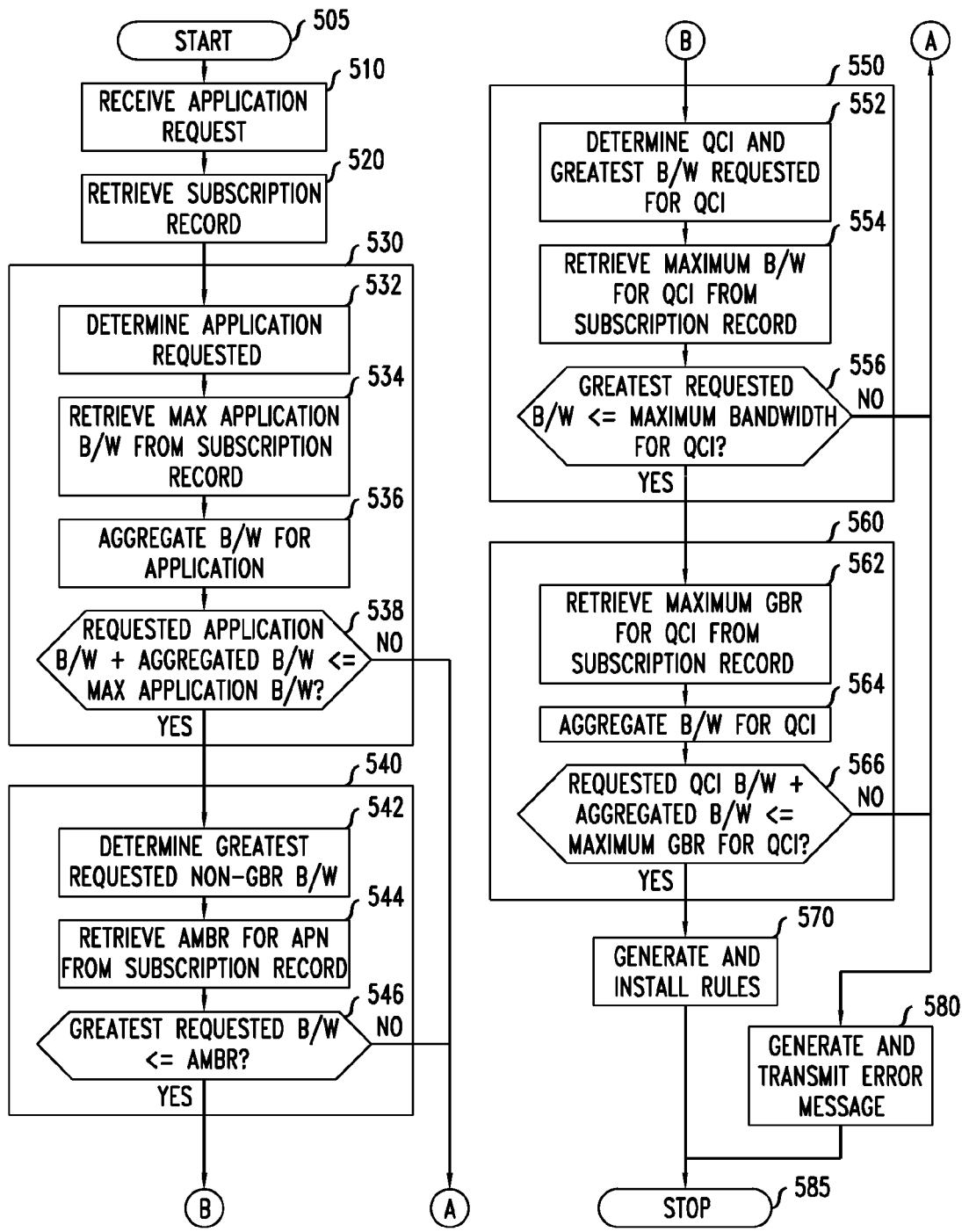
FIG. 5 illustrates an exemplary method for authorizing sessions using subscriber information.

FIG. 5 illustrates an exemplary method 500 for authorizing sessions using subscriber information. Method 500 may be performed by the components of PCRN 200. Method 500 may begin in step 505 and proceed to step 510 where PCRN 200 may receive an application request from, for example, an AF or PGW. Method 500 may then proceed to step 520 where the PCRN 200 may extract at least one subscriber identifier from the application request and retrieve the associated subscription record from, for example, an SPR.

PCRN 200 may then determine, in step 530, whether fulfillment of the application request would violate a maximum bandwidth allowable for the requested application. As one example of implementing this functionality, method 500 may proceed to sub-step 532 where PCRN 200 may determine an application ID associated with the request by, for example, extracting an application ID from the application request. Next, in sub-step 534, PCRN 200 may retrieve an appropriate maximum application bandwidth value from the subscription record. For example, PCRN 200 may locate an application sub-record for the appropriate APN and application. Then, in sub-step 536, PCRN 200 may aggregate the bandwidths already provisioned for this user and application by, for example, referring to the PCC rules currently in force. In various embodiments, other methods know to those of skill in the art may be used for determining a current bandwidth usage. In such embodiments, the method of aggregation may be selected by an operator or vendor of the PCRN 200 or may be hard-coded into the operation of the PCRN 200. Finally, in sub-step 538, PCRN 200 may determine whether the requested bandwidth plus the aggregated bandwidth exceeds the maximum application bandwidth value. If so, the request should not be fulfilled and method 500 may proceed to step 580. If, however, fulfillment of the request would not violate the maximum application bandwidth, method 500 may proceed to step 540.

In step 540, PCRN 200 may determine whether fulfillment of the application request would violate the AMBR for the APN. As one example of implementing this functionality, method 500 may proceed to sub-step 542 where PCRN 200 may determine the greatest requested non-GBR bandwidth among the individual SDFs requested by the application request. At this step, PCRN 200 may only consider SDFs requesting a QCI defined to be a non-GBR QCI. For example, any QCI less than QCI "5" may be defined as a non-GBR QCI. Next, the PCRN 200 may retrieve an AMBR value for the appropriate APN from the subscription record in sub-step 544. Finally, in sub-step 546, PCRN 200 may determine whether the greatest requested non-GBR bandwidth exceeds the AMBR value. If so, the request should not be fulfilled and method 500 may proceed to step 580. If, however, fulfillment of the request would not violate the AMBR for the APN, method 500 may proceed to step 550. In various alternative embodiments, instead of determining the greatest requested non-GBR bandwidth, PCRN 200 may simply perform step 540 for each requested non-GBR SDF.

In step 550, PCRN 200 may determine whether fulfillment of the request would violate a maximum bandwidth for any QCI associated with the APN. As one example of implementing this functionality, method 500 may proceed to sub-step 552, where PCRN 200 may determine a QCI for at least one requested SDF and the greatest requested bandwidth associated with that QCI. For example, in some embodiments, PCRN 200 may simply extract a requested QCI and GBR from the application request. As a further example, in some embodiments, PCRN 200 may determine an appropriate QCI and/or GBR based on a media type of the requested SDF. It will be appreciated that any method suitable for determining a requested QCI and/or GBR may be used, including combinations of the herein-described methods.

Next, in sub-step 554, PCRN 200 may retrieve a maximum bandwidth available for the QCI on this APN from the subscription record. Finally, in sub-step 556, PCRN 200 may determine whether the greatest requested bandwidth for the QCI exceeds the maximum bandwidth available for the QCI on this APN. If so, the request should not be fulfilled, and method 500 may proceed to step 580. If, however, fulfillment of the request would not violate the maximum bandwidth available for the QCI, method 500 may proceed to step 560. In various alternative embodiments, instead of determining the greatest requested bandwidth associated with a QCI, PCRN 200 may simply perform step 550 for each requested SDF.

In step 560, PCRN 200 may determine whether fulfillment of the request would violate a maximum GBR for any QCI associated with the APN. As one example of implementing this functionality, method 500 may proceed to sub-step 562 where PCRN 200 may retrieve a maximum GBR for the QCI on this APN from the subscription record. Next, in sub-step 564, PCRN 200 may aggregate the GBRs already provisioned for this user and QCI by, for example, referring to the PCC rules currently in force. Finally, in sub-step 566, PCRN 200 may determine whether the aggregated existing GBR plus requested GBR for the QCI would exceed the maximum GBR allowed for the QCI on this APN for this user. If so, the request should not be fulfilled, and method 500 may proceed to step 580. If however, fulfillment of the request would not violate the maximum GBR allowable for the QCI, method 500 may proceed to step 570.

In various embodiments, PCRN 200 may have a maximum authorized bandwidth value associated with a QCI indicating at the bearer level what amount of bandwidth has been authorized. In such embodiments, PCRN 200 may use this value as the aggregated existing GBR rather than the actual aggregate of the applicable existing PCC rules.

In various embodiments, a single application request may include requests for SDFs having different QCIs. In such cases, method 500 may loop through steps 550 and 560 for every available QCI or for each QCI that provides a GBR. Alternatively, steps 550 and 560 may be performed without respect to particular QCIs and, instead, apply across all QCIs that provide a GBR. For example, if QCIs 5, 6, 7, 8, and 9 are defined to provide GBRs, then steps 550 and 560 may determine the greatest requested bandwidth among those QCIs and aggregate all existing and requested bandwidths from those QCIs, respectively. Further modifications will be apparent to those of skill in the art.

Method 500 may proceed to step 570 when the application request has passed each validity check. Accordingly, since the application request may be fulfilled, PCRN 200 may generate and install appropriate PCC and/or QoS rules for fulfilling the request. Method 500 may then end in step 585. If, however, the application request failed any of the validity checks, PCRN 200 may generate and transmit an error response in step 580. In various embodiments, PCRN 200 may insert into the response information identifying what requested bandwidths and/or GBRs would have been allowable. Method 500 may then end in step 585.

It will be appreciated by a person of ordinary skill in the art that steps 530, 540, 550, 560 can be performed in any combination and in any order. For example, various alternative embodiments may perform steps 550, 560 before performing steps 530, 540. As a further example, various alternative embodiments may perform steps 540, 560, 550 in such an order without performing step 530 at all.

Having described exemplary components and methods for the operation of exemplary subscriber network 100 and PCRN 200, an example of the operation of exemplary network 100 and PCRN 200 will now be provided with reference to FIGS. 1-5. PCRN 136 may correspond to PCRN 200. The contents of SPR 138 may be indicated by data arrangement 300 and the contents of rule storage 235 may be indicated by data arrangement 400.

The process may begin when PCRN 136, 200 receives AAR 160 and/or CCR 170, defining an application request. The application request may be associated with subscriber IDs "A" and "C," as well as APN "0xBB4D." The application request may further be associated with application ID "0x2D95" and two SDFs, SDF A and B. The application request may request a QCI of "8," a maximum bandwidth of 16 kbps in both directions, and a GBR of 8 kbps in both directions for SDF A. The application request may also request a QCI of "2," a maximum bandwidth of 8 kbps in both directions, and no GBR for SDF B.

In step 520, subscription record retriever 220 may use the subscriber IDs "A" and "C" to retrieve matching subscription record 350 from SPR 138. Subscription record analyzer 230 may then proceed to determine whether a maximum application bandwidth value would be exceeded by the request in step 530. First, subscription record analyzer 230 may determine that the application request relates to application "0x2D95" and retrieve the maximum application bandwidth of 32 kbps upstream and 128 kbps downstream from application sub-record 365. Next, subscription record analyzer 230 may aggregate all existing bandwidth for this application, user, and APN combination. Only rule record 440 may apply to this context, so the aggregated bandwidth is 16 kbps upstream and 32 kbps downstream. Finally, subscription record analyzer 230 may determine whether the application request would exceed the maximum application bandwidth. Adding the bandwidth requested for SDFs A and B and the existing aggregated bandwidth, subscription record analyzer 230 determines that the potential allocated application bandwidth is 40 kbps upstream and 56 kbps downstream. Because this potential bandwidth exceeds the maximum application bandwidth, subscription record analyzer 230 may determine that the application request should not be fulfilled and transmit the request to error response generator 240.

Error response generator 240 may then generate an AAA and/or CCA to inform the requesting node(s) that the request was not authorized. Additionally, error response generator may include an indication of what requested bandwidth would have been acceptable. For example, error response generator 240 may insert an Acceptable-Service-Information AVP into the AAA that indicates that what the maximum application bandwidth is for the requested application. Response transmitter 250 may then transmit the response(s) to the appropriate node(s) and the method may end.

If, however, PCRN 136, 200 is an alternative embodiment that either does not perform the maximum application bandwidth validation of step 530 or authorizes an alternative QoS from that requested when possible, subscription record analyzer 230 would have proceeded to ensure the application request would not violate the AMBR for the APN in step 540. Here, subscription record analyzer 230 would first determine that SDF B has the greatest (and only) requested maximum bandwidth for a non-GBR flow at 8 kbps. Since this does not exceed the AMBR of 1024 kbps specified by APN sub-record 360, subscription record analyzer 230 may proceed to step 550.

At step 550, subscription record analyzer 230 may determine whether the request exceeds a maximum bandwidth for any QCI. First, subscription record analyzer 230 may determine that SDF A represents the greatest requested maximum bandwidth for the QCI "8" at 16 kbps. Since this does not exceed the maximum bandwidth for QCI "8" of 256 kbps specified by APN sub-record 360, subscription record analyzer 230 may proceed to step 560. In various embodiments, subscription record analyzer 230 may first perform the same steps with respect to QCI "2," as requested by SDF B, before proceeding to step 560.

At step 560, subscription record analyzer 230 may determine whether the request exceeds a maximum guaranteed bandwidth for any GBR QCI. First, subscription record analyzer 230 may determine that SDF A requests the GBR QCI "8" and a GBR of 8 kbps in both directions. Next, subscription record analyzer 230 may retrieve the maximum GBR for QCI "8" of 64 kbps in both directions from APN sub-record 360. Then, subscription record analyzer 230 may aggregate all existing GBRs for this user of this APN on QCI "8." Only rule record 450 matches this criteria, so the aggregated GBR for QCI "8" may be set to 32 kbps in both directions. Adding the requested GBR and the existing aggregated GBR for QCI "8," subscription record analyzer 230 may determine that the potential GBR is 40 kbps in both directions. Because this does not exceed the maximum GBR for QCI "8," subscription record analyzer 230 may pass the message to rule generator 245 for fulfillment of the request in step 570. In various embodiments, subscription record analyzer 230 may first perform the same steps with respect to any other GBR QCI requested for an SDF. Here, since QCI "2" is a non-GBR QCI, step 560 may not be performed with respect to SDF B.

According to the foregoing, various exemplary embodiments provide for a system that utilizes a robust method for authorizing and fulfilling application requests. Particularly, by ensuring that fulfillment of a request would not violate limits contained in a subscription profile record, a PCRN may ensure that only valid requests are fulfilled while implementing per subscriber, per APN, per QCI, and/or per application usage limits.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for processing a request based on subscriber information, the method comprising:
    receiving, at the PCRN from a requesting entity, a message including a request associated with at least one service data flow (SDF);
    extracting a subscriber identifier and a first identifier from the message;
    retrieving a subscription record associated with the subscriber identifier, wherein the subscription record is associated with a first plurality of subrecords;
    identifying a first subrecord from the plurality of subrecords based on the first identifier;
    conditionally fulfilling the request based on a first value stored in the first subrecord; and
    identifying a second subrecord from a second plurality of subrecords based on a second identifier carried by the message,
    wherein conditionally fulfilling the request is further performed based on a second value stored in the second subrecord.

2. The method of claim 1, wherein the subscription record carries the first plurality of subrecords.

3. The method of claim 1, wherein the first identifier comprises one of an access point name (APN) and an application identifier.

4. The method of claim 1, wherein the first value comprises one of a maximum bandwidth for a quality of service (QoS) class identifier (QCI), a maximum guaranteed bitrate for a QCI, an aggregate maximum bitrate (AMBR), and a maximum bandwidth for an application.

5. The method of claim 1, wherein the at least one SDF is associated with an Internet Protocol Connectivity Access Network (IP-CAN) session.

6. The method of claim 1, wherein:
    the first value is associated with a first attribute,
    a second subrecord from the first plurality of subrecords stores a second value associated with the first attribute, and
    the first value is different from the second value.

7. The method of claim 1, further comprising:
    identifying a quality of service (QoS) class identifier (QCI) associated with the request; and extracting the first value from the subrecord based on the QCI.

8. A policy and charging rules node (PCRN) for processing a request based on subscriber information, the PCRN comprising:
- a memory device; and
- at least one processor in communication with the memory device, the at least one processor being configured to:
  - receive, from a requesting entity, a message including a request associated with at least one service data flow (SDF);
  - extract a subscriber identifier and a first identifier from the message;
  - retrieve a subscription record associated with the subscriber identifier, wherein the subscription record is associated with a first plurality of subrecords;
  - identify a first subrecord from the plurality of subrecords based on the first identifier;
  - conditionally fulfill the request based on a first value stored in the first subrecord; and
  - identify a second subrecord from the second plurality of subrecords based on a second identifier carried by the message,
  - wherein, in conditionally fulfilling the request the processor is configured to conditionally fulfill the request based on the first value and a second value stored in the second subrecord.

9. The PCRN of claim 8, wherein the subscription record carries the first plurality of subrecords.

10. The PCRN of claim 8, wherein the first identifier comprises one of an access point name (APN) and an application identifier.

11. The PCRN of claim 8, wherein the first value comprises one of a maximum bandwidth for a quality of service (QoS) class identifier (QCI), a maximum guaranteed bitrate for a QCI, an aggregate maximum bitrate (AMBR), and a maximum bandwidth for an application.

12. The PCRN of claim 8, wherein the at least one SDF is associated with an IP-CAN session.

13. The PCRN of claim 8, wherein:
- the first value is associated with a first attribute,
- a second subrecord from the first plurality of subrecords stores a second value associated with the first attribute, and
- the first value is different from the second value.

14. The PCRN of claim 8, wherein the processor is further configured to:
- identify a quality of service (QoS) class identifier (QCI) associated with the request; and
- extract the first value from the subrecord based on the QCI.

15. A non-transitory machine-readable medium encoded with instructions for execution by a policy and charging rules node (PCRN) for processing a request based on subscriber information, the medium comprising:
- instructions for receiving, at the PCRN from a requesting entity, a message including a request associated with at least one service data flow (SDF);
- instructions for extracting a subscriber identifier and a first identifier from the message;
- instructions for retrieving a subscription record associated with the subscriber identifier, wherein the subscription record is associated with a first plurality of subrecords;
- instructions for identifying a first subrecord from the plurality of subrecords based on the first identifier;
- instructions for conditionally fulfilling the request based on a first value stored in the first subrecord; and
- instructions for identifying a second subrecord from a second plurality of subrecords based on a second identifier carried by the message,
- instructions for wherein conditionally fulfilling the request is further performed based on a second value stored in the second subrecord.

16. The non-transitory machine-readable medium of claim 15, wherein the subscription record carries the first plurality of subrecords.

17. The non-transitory machine-readable medium of claim 15, wherein:
- the first identifier comprises one of an access point name (APN) and an application identifier, and
- the first value comprises one of a maximum bandwidth for a quality of service (QoS) class identifier (QCI), a maximum guaranteed bitrate for a QCI, an aggregate maximum bitrate (AMBR), and a maximum bandwidth for an application.

18. The non-transitory machine-readable medium of claim 15, wherein the at least one SDF is associated with an IP-CAN session.

19. The non-transitory machine-readable medium of claim 15, wherein:
- the first value is associated with a first attribute,
- a second subrecord from the first plurality of subrecords stores a second value associated with the first attribute, and
- the first value is different from the second value.

20. The non-transitory machine-readable medium of claim 15, further comprising:
- instructions for identifying a quality of service (QoS) class identifier (QCI) associated with the request; and
- instructions for extracting the first value from the subrecord based on the QCI.

* * * * *